United States Patent [19]

Hansen et al.

[11] Patent Number: 5,034,495
[45] Date of Patent: Jul. 23, 1991

[54] NOVEL HARDENING AGENTS

[75] Inventors: Achim Hansen, Dusseldorf; Alfred Mathes, Rheinberg; Jürgen Zehrfeld, Voerde, all of Fed. Rep. of Germany

[73] Assignee: Rutgerswerke AG, Fed. Rep. of Germany

[21] Appl. No.: 534,714

[22] Filed: Jun. 7, 1990

[30] Foreign Application Priority Data

Jun. 12, 1989 [DE] Fed. Rep. of Germany ....... 3919128

[51] Int. Cl.$^5$ ............................................. C08G 59/50
[52] U.S. Cl. ...................................... 528/111; 528/45; 528/367; 528/369; 560/158
[58] Field of Search ................ 528/45, 111, 367, 369; 560/158

[56]  References Cited

U.S. PATENT DOCUMENTS

| | | | |
|---|---|---|---|
| 4,115,360 | 9/1978 | Schulze et al. | 528/111 X |
| 4,115,361 | 9/1978 | Schulze et al. | 528/111 |
| 4,115,446 | 9/1978 | Schulze | 528/111 X |
| 4,122,069 | 10/1978 | Meyer | 528/111 X |
| 4,139,524 | 2/1979 | Waddill | 528/111 X |
| 4,178,426 | 12/1979 | Waddill | 528/111 |
| 4,187,367 | 2/1980 | Waddill | 528/111 X |

Primary Examiner—Earl Nielsen
Attorney, Agent, or Firm—Bierman and Muserlian

[57] ABSTRACT

A hardening agent for epoxy prepared by reacting A) a hydroxy containing ketimino compound with B) a diisocyanate compound with one isocyanate group blocked, reacting the resulting adduct with C) a polyether amine and hydrolysis of the reaction product, reactants A), B) and C) being in approximately stoichiometric amounts resulting in flexible hardened products of good resistance to chemicals and aging.

11 Claims, No Drawings

NOVEL HARDENING AGENTS

STATE OF THE ART

DE-OS 3,151,592 describes high-grade flexible hardeners which are produced by reaction of addition products of polyether urethane carbamic acid aryl esters and amines or ketimines. These hardeners have a number of disadvantages resulting from the type of substances used for their composition and of the synthesis method connected therewith. Thus, the polyalkylenepolyether urethane polyisocyanates used as the intermediate stage are prepared by reaction of di- and/or poly-functional polyalkylenepolyether polyos with isocyanates that are also di- and/or poly-functional. Reations involving several di- and/or poly-functional compounds lead to a plurality of reactions and reaction products with the result that the hardeners assume through secondary reactions a higher viscosity, which must be compensated by addition of viscosity-lowering modification agents. This means that the composition of the hardeners varies from batch to batch. Moreover, low molecular weight isocyanate adducts readily form which may lead to reduced elasticity.

The proportion of components of higher molecular weight can indeed be reduced by use of an excess of polyisocyanate in the synthesis of the intermediate stage, but in that case, a considerable proportion of unreacted polyisocyanate remains in the reaction mixture which must either be removed by distillation, and this requires considerable process cost, especially because of the high boiling points of the normally used polyisocyanates, or the free polyisocyanates are left in the reaction mixture. However, this may lead to additional formation of low molecular weight isocyante adducts and hence to additional reduction of the elasticity of the molding substances.

Besides, the polyether urethane polyisocyanates or polyether urethane carbamic acid aryl esters obtained as intermediates in the synthesis are often highly viscous substances. This requires the use of a solvent and elevated reaction temperatures which afterwards, the solvent must be removed by distillation.

OBJECTS OF THE INVENTION

It is an object of the invention to provide novel flexible hardening agents for epoxy resins with a lower viscosity, uniform properties and elasticizing activity not reduced by low molecular weight adducts.

It is another object of the invention to provide novel epoxy resin compositions with a hardening agent of the invention and products produced therefrom.

These and other objects and advantages of the invention will become obvious from the following detailed description.

THE INVENTION

The novel hardening agents of the invention for epoxy resins are prepared by reacting A) a hydroxy continuing ketimino compound with B) a diisocyanate compound with one isocyanate group blocked, reacting the resulting adduct with C) a polyether amine and hydrolysis of the reaction products, reactants, A), B) and C) being in approximately stoichiometric amounts.

The low-viscosity hardeners of the invention with epoxy compounds give flexible hardened products having good resistance to chemicals and aging, good electrical and physical properties, particularly with good elasticity remaining constant from batch to batch. They are useful for the production of laminates, coatings, adhesives and sealants and flexible shaped parts or flat structures based on epoxy resins. The amino-terminal hardening agents are polyalkylenepolyether carbamic acid urethanes.

The amino-terminal hardening agents of the invention are light-colored products of low to high viscosity (5–70 Pa) which can be mixed with epoxy compounds, in particular epoxy resins with at least two epoxide groups per molecule unit, either at room temperature over 24 to 48 hours after mixing (processibility time: 1–5 hours) or at elevated temperature (20–40 minutes at 120° C.).

The process for the preparation for the hardening agents of the invention comprises three reaction steps from preliminary products known per se: namely (1) Reaction of hydroxyl containing ketimino compounds with diisocyanate compounds having one isocyanate group blocked which results selectively in a urethane bond from the reaction of the hydroxyl group with the free isocyanate group.

(2) Reaction of reaction product from (1) with a polyetheramine with splitting off of the protective group of the second isocyanate group and formation of a urea bond by reaction of the resulting isocyanate group with the amino group.

(3) Hydrolysis of the reaction product from (2) with splitting of the imino group and hence release of the primary amino group.

For reaction (1), either commerical hydroxyl containing ketimines and partially blocked isocyanates are used. These products can be prepared in a manner known per se: for example, the ketimines are prepared by reaction of alkanol amines such as ethanolamine or propanolamine with ketones such as acetone, methylethyl ketone or methyl-isobutyl ketone. The partially blocked isocyanates are prepared by reaction of diisocyanates with an equimolar amount of isocyanate blocking group compounds.

Examples of suitable diisocyanates are 2,4- and 2,6-toluylene diisocyanate and mixtures thereof, 4,4-diphenylmethane diisocyanate, m-xylylene diisocyanate, 2,2,4-(2,4,4)-trimethyl-hexamethylene diisocyanate, or 1-isocyanato-3-isocyanatomethyl-3,5,5-trimethyl-cyclohexane (also called isophorane diisocyanate). Expecially preferred are aliphatic and cycloaliphatic diisocyanates such as hexamethylene diisocyanate and isophorone diisocyanate.

Isocyanate group-blocking compounds are those which react with isocyanates with the formation of a labile compound to serve as a protective group for the isocyanate group as long as the isocyanates blocked with them are treated in a temperature range below the decomposition point of the blocked isocyanate. Examples of such blocking compounds are phenols, oximes, lactams, bisulfite or CH-acid compounds, but preferably alkylphenols such as nonyl phenol. The products are as a rule liquid and they can be used for the reaction as pure substance or as a solution in a solvent. The reaction takes place at a temperature range of 40°–120° C., preferably at 60°–80° C.

The resulting intermediate product can be mixed directly without further processing with an equimolar amount of a polyether amine and the reaction takes place at a temperature range of 40°–100° C., preferably at 60°–80° C., over about 3 hours. Polyetheramines are compounds with a basic chain of polyethylene glycol or polypropylene glycol and at least one primary or secondary amino group, possibly jointly with other functional groups such as amide groups. Their molecular weight ranges from 148 to about 5000. Numerous such polyether amines are known in the literature and are obtainable on the market under the designation Jeffamine (R).

Following the reaction with polyetheramine, the reaction mixture is mixed with water in about 2 to 10 times the equimolar amount and held at 80°–100° C. for about 1 to 5 hours to cause hydrolysis of the imino group. Thereafter the excess water, the released ketone, and the blocking compound released in the preceding step are separated out by distillation.

The remaining product is a uniform, light-colored liquid and is ready for use for hardening epoxy resins. To this end, epoxy compounds and the hardening agent of the invention are mixed in an approximately equimolar ratio of amino and epoxide groups, processed within the processing time in accordance with the purpose of use, and hardened at room or elevated temperature, i.e., 5° to 140° C. The epoxy resin thus hardened is a flexible material of high-grade physical and electrical properties and good chemical stability. The hardening agents of the invention are used, therefore, together with one or more epoxy compounds for the production of flexible shaped parts or flat structures, particularly laminates, as well as for the production of sealants and adhesives or coatings.

In the following examples there are described several preferred embodiments to illustrate. However, it should be understood that the invention is not intended to be limited to the specific embodiments. The precentages are parts by weight.

EXAMPLE 1

A mixture of 61 g of ethanolamine, 144 g of methyl ethyl ketone, 300 g of cyclohexane and 0.2 g of p-toluol sulfonic acid at the water separator was refluxed until the water separation was finished (about 4 to 5 hours). The light yellow liquid, hydroxy ketimine, had an OH equivalent of 490 g/equiv.

EXAMPLE 2

A mixture of 87 g of 2,4-toluol diisocyanate, 110 g of nonyl phenol and 0.1 g of dibutyl tin dilaurate was heated for 3 hours at 60° C. Then, 253 g of the ketimine of Example 1 were added and the mixture was heated for another 3 hours at 80° C. to form a ketimine-urethane-carbamic acid aryl ester with a masked NCO equivalent of 890 g/equiv.

EXAMPLE 3

242 g of the ketimine-urethane-carbamic acid aryl ester of Example 2 and 250 g of polypropylene ether diamine 2000 (molar mass 2000, amine equivalent 500 g/equiv.) were heated with stirring for 3 hours at 70° C. The ketimine was hydrolyzed with 36 g of water by heating for 2 hours at 80° C. The solvent, ketone and water were then removed in a rotary evaporator to form a flexible hardening agent, namely polyether-urea-urethananmine having a viscosity of 25,600 mPa.s at 25° C. and an amine equivalent of 744 g/equiv. This flexible parent component was soluble in the usual solvents and well miscible with amines and epoxy resins.

EXAMPLE 4

121 g of isophorone diisocyanate, 110 g of nonyl phenol and 0.15 g of dibutyl tin dilaurate were heated for 3 hours at 60° C. and then 2 hours at 80° C. Then, 253 g of hydroxyl ketimine of Example 1 were added and the mixture was heated for another 3 hours at 80° C. to form a ketimine-urethane-carbamic acid aryl ester with a masked NCO equivalent of 484 g/equiv.

EXAMPLE 5

259 g of ketimine-urethane-carbamic acid aryl ester of Example 4 and 100 g of polypropylene ether diamine 400 (molar mass 400, equivalent 100) were heated with stirring for 2 hours at 60° C. and then 1 hour at 80° C. The ketimine was hydrolyzed with 36 g of water for 2 hours at 80° C. The solvent, ketone and water were then removed at the rotary evaporator and the flexible hardening agent, polyether-urea-urethanamine, had a viscosity of 52,400 mPa.s at 52° C. and an amine equivalent of 344 g/equiv. This product was soluble without residue in aromatic solvents, ketones, nonyl phenol and aliphatic and cycloaliphatic amine.

EXAMPLE 6

Hardener formulation:

A mixture of 60 wt. % of hardener component of Example 3, 8 wt. % of coconut oil amine, 11.5 wt. % m-xylylene diamine and 20.5 wt. % of nonyl phenol had an amine equivalent of 200. 100 wt. % of the hardener formulation were mixed with 93 wt. % of epoxy resin on the basis of Bisphenol A and epichlorohydrin having an epoxide equivalent of 186. Then, plates 4 mm thick were produced, and the tensile strength was determined according to DIN 53,455, the elongation according to DIN 53,456, the Shore D value according to DIN 53,505, and the resistance to tear propagation according to DIN 53,515. The results were as follows:

|  | 24 Hours/23° C. | 7 days/23° C. |
| --- | --- | --- |
| Tensile strength | 5.3 N/mm$^2$ | 7.5 N/mm$^2$ |
| Elongation | 221% | 171% |
| Shore D | 29 | 44 |
| Tearing strength | 22 N/mm | 34 N/mm |

EXAMPLE 7

A hardener formulation of 60 wt. % of hardener component of Example 3, 10.5 wt. % of stearyl amine; 11.5 wt. % of m-xylene diamine and 17.9 wt. % of diisopropyl naphthalene had an amine equivalent of 200. 100 wt. % of the hardener formulation were mixed with 93 wt. % of epoxy resin on the basis of Bisphenol A and epichlorohydrin with an epoxide equivalent of 186. Thereafter, plates 4 mm thick were produced, and the tensile strength was determined according to DIN 53,455, the elongation according to DIN 53,455, the Shore D value according to DIN 53,505, and the resistance to tear propagation according to DIN 53,5515. The results were as follows:

|  | 24 Hours/23° C. | 7 days/23° C. |
| --- | --- | --- |
| Tensile strength | 3.5 N/mm$^2$ | 5.6 N/mm$^2$ |
| Elongation | 299% | 179% |
| Shore D | 17 | 24 |

-continued

|  | 24 Hours/23° C. | 7 days/23° C. |
| --- | --- | --- |
| Tearing strength | 15 N/mm | 26 N/mm |

EXAMPLE 8

A hardener formulation of 60 wt. % of hardener component of Example 3; 8 wt. % of coconut oil amine; 11.5 wt. % of m-ethylene diamine; 11 wt. of nonyl phenol and 9.5 wt. % of dibutyl phthalate had an amine equivalent of 200. 100 wt. % of the hardener formulation was mixed with 93 wt. % of epoxy resin on the basis of Bisphenol A and epichlorohydrin with an epoxide equivalent of 186. Then, plates 4 mm thick were produced, and the tensile strength was determined according to DIN 53,455, the elongation according to DIN 53,455, the Shore D value according to DIN 53,505, and the resistance to tear propagation according to DIN 53,515. The results were as follows:

|  | 7 days/23° C. |
| --- | --- |
| Tensile strength | 6.7 N/mm$^2$ |
| Elongation | 206% |
| Shore D | 32 |
| Tearing strength | 32 N/mm |

EXAMPLE 9

A hardener formulation of 55 wt. % of hardener component of Example 5, 16.2 wt. % of N-aminoethyl piperazine and 28.8 wt. % of nonyl phenol had an amine equivalent of 186. 100 wt. % of the hardener formulation was mixed with 100 wt. % of epoxy resin on the basis of Bisphenol A and epichlorohydrin with an epoxide equivalent of 186. Then, plates 4 mm thick were produced, and the tensile strength was determined according to DIN 53,455, the elongation according to DIN 53,455, the Shore D value according to DIN 53,505, and the resistance to tear propagation according to DIN 53,515. The results were as follows:

|  | 7 days/23° C. |
| --- | --- |
| Tensile strength | 12.3 N/mm$^2$ |
| Elongation | 97% |
| Shore D | 53 |

-continued

|  | 7 days/23° C. |
| --- | --- |
| Tearing strength | 43 N/mm |

Various modifications of the compositions and method of the invention may be made without departing from the spirit or scope thereof and it is to be understood that the invention is intended to be limited only as defined in the appended claims.

What we claim is:

1. A hardening agent for epoxy compound prepared by reacting A) a hydroxy containing ketimino compound with B) a diisocyanate compound with one isocyanate group blocked, reacting the resulting adduct with C) a polyether amine and hydrolysis of the reaction product, reactants A), B) and C) being in approximately stoichiometric amounts.

2. An agent of claim 1 wherein the hydroxy containing ketimino compound is the reaction product of equimolar amounts of ethanolamine and methyl isobutyl ketone.

3. An agent of claim 1 wherein the diisocyanate is an adduct of equimolar amounts of isophorone diisocyanate and nonyl phenol.

4. An agent of claim 1 wherein the polyetheramine is a polyethylene glycol or polypropylene glycol containing at least one primary or secondary amino group.

5. An agent of claim 4 wherein the polyetheramine has a molecular weight of 148 to 5,000.

6. A method of preparing a hardening agent of claim 1 comprising reacting approximately equimolar amounts of A) a hydroxy containing ketimino compound and B) a diisocyanate compound having one isocyanate group blocked, reacting the resulting adduct with an approximately equimolar amount of a polyetheramine, hydrolyzing the resulting product with water and distilling the hydrolysis product to obtain the hardening agent.

7. A flexible shaped element or flat structure made from at least one epoxy resin hardened with a hardening agent of claim 1.

8. A laminate made from at least one epoxy resin hardened with a hardening agent of claim 1.

9. A epoxy resin adhesive or coating containing a hardening agent of claim 1.

10. An epoxy resin sealant containing a hardening agent of claim 1.

11. A curable epoxy resin containing a hardening agent of claim 1.

* * * * *